United States Patent
Keenan et al.

(10) Patent No.: US 10,430,888 B2
(45) Date of Patent: Oct. 1, 2019

(54) SYSTEM FOR ACCESSING AND VALIDATING CLIENT DATA WITH THIRD PARTY SYSTEMS

(71) Applicant: Hartford Fire Insurance Company, Hartford, CT (US)

(72) Inventors: Katie Elizabeth Keenan, Santa Monica, CA (US); Brian J. Palmatier, Coventry, CT (US); Etra Rancourt, Avon, CT (US)

(73) Assignee: Hartford Fire Insurance Company, Hartford, CT (US)

( * ) Notice: Subject to any disclaimer, the term of this patent is extended or adjusted under 35 U.S.C. 154(b) by 1026 days.

(21) Appl. No.: 14/464,216

(22) Filed: Aug. 20, 2014

(65) Prior Publication Data
US 2016/0055588 A1    Feb. 25, 2016

(51) Int. Cl.
*G06Q 40/00* (2012.01)
*G06Q 40/08* (2012.01)
*G06Q 50/20* (2012.01)

(52) U.S. Cl.
CPC ............ *G06Q 40/08* (2013.01); *G06Q 50/20* (2013.01)

(58) Field of Classification Search
CPC .............................. G06Q 40/06; G06Q 40/00
USPC ............................................ 705/4, 2, 38, 35
See application file for complete search history.

(56) References Cited

U.S. PATENT DOCUMENTS

| 4,839,804 A | 6/1989 | Roberts et al. |
| 2002/0042772 A1 | 4/2002 | Rudman et al. |
| 2006/0020539 A1* | 1/2006 | Salter ............... G06Q 10/00 705/38 |
| 2006/0116903 A1 | 6/2006 | Becerra |
| 2010/0306108 A1 | 12/2010 | Bierer et al. |

* cited by examiner

*Primary Examiner* — Ojo O Oyebisi
(74) *Attorney, Agent, or Firm* — Howard IP Law Group (57) ABSTRACT

A computer system for validating user data based on third party data includes a system configured to obtain data, from third party computer systems, such as academic institution computer systems and job agency computer systems, indicative of graduation, subsequent unemployment and reasonable job search by an insured, relating to claim payments to cover interest or interest and principal repayment on tuition debt for a period of time after a student graduates, subject to the student engaging in a reasonable job search, with insurability and pricing based on underwriting factors such as type of school attended, grade point average and area of study.

16 Claims, 9 Drawing Sheets

SYSTEM FOR ACCESSING AND VALIDATING CLIENT DATA WITH THIRD PARTY SYSTEMS

BACKGROUND

The cost of tuition for higher education has skyrocketed in recent years. Previously students could attend private and public colleges without building debt. However, with the rapidly rising price of education today, it has become almost a certainty that college graduates will be left with significant tuition debt upon receiving their degree. With the current yearly cost of a 4-year institution ringing in at about $34,000 for private schools and $17,000 for public institutions, not including living expenses and housing, it is becoming increasingly difficult to pay for higher education without financing. Currently, about two-thirds of bachelor degree recipients had to take out loans to attend school, either through the government or privately.

The problem lies not in the loans themselves, but in the difficulty in paying them off after graduating in our current job market. It has been estimated that there are about 37 million student loan borrowers in the United States. Together, their loans add up to over $1 trillion dollars and have exceeded mortgage based debt in this country. That being said, the lack of jobs for recent graduates, coupled with the massive tuition debt, is a similar set up to what recently occurred with the housing market. In many instances, college graduates have massive debt and their income is not enough to match the payments. This is potentially setting up the country to see a massive tuition loan default in the near future.

Currently, 48% of 25-34 year olds say that they are underemployed or unemployed. Considering that a significant portion of those 37 million student borrowers would fall within that specific group, a real problem is surfacing. As it stands now, about 41% of borrowers become delinquent within the first five years, and that percentage is poised to go up. As the majority of high school graduates go to college and tuition rises create an even greater need to take out loans, widespread defaults may occur. What is needed today is a way to insure against those loan defaults; to help graduates who do not find a job immediately after graduation (or one that matches their potential) from defaulting on their loans when their loan payments are due, considering grace periods built in to some loans.

Accordingly, there is a need for a system and process that addresses the needs of graduates and the loan issues they face.

SUMMARY

The present invention in some embodiments to a computer system for administering tuition debt insurance, the system comprising: at least one processor; a memory coupled to the at least one processor; and one or more programs, wherein the one or more programs are stored in the memory and configured to be executed by the at least one processor, the one or more programs including instructions for: receiving a tuition debt policy request from an individual via a mobile computing device, the request including request data comprising at least a school attended by the individual and a performance characteristic associated with the individual at the school; and generating pricing information based at least in part on the request data; and displaying the pricing information and one or more tuition debt insurance coverage options corresponding to the pricing information to the individual; receiving a selection of a selected one of the tuition debt insurance coverage options; storing, in a policy record data storage device, a policy record associated with the selected tuition debt insurance coverage option; and transmitting to the mobile computing device an indication of coverage for the individual for the tuition debt coverage option.

In some embodiments, the present invention relates to a computer implemented method of operating a computer system to process an insurance claim for tuition debt coverage, the computer implemented method comprising: receiving information identifying a claim and a tuition debt coverage policy from a policyholder; retrieving, from a policy database, information associated with the tuition debt coverage policy; requesting policyholder information related to at least a graduation date and job search data; validating the policyholder information related to the graduation date and job search data from at least one third party database; determining a claim payment amount based on the validated policyholder information; and issuing claim payment instructions for the determined claim payment amount.

In some embodiments, the present invention relates to a computer system for processing data for tuition debt insurance coverages, comprising: an insurance data computer system comprising: one or more computer processors, and a computer usable medium, accessible by the one or more computer processors, having a computer readable program code embodied therein, said computer readable program code adapted to be executed to implement a method for processing data for tuition debt insurance coverages, said method comprising: receiving a tuition debt insurance quote request from a user; determining a price for the tuition debt insurance quote request based at least in part on a school attended by the user, a grade point average of the user, a loan identifier and a graduation date for the user; issuing an electronic communication to the user, wherein the electronic communication includes at least one of a premium amount for the tuition debt insurance coverage; a communications device in communication with the insurance data system and in communication with one or more networks for communicating the electronic communication to the user; and an insurance workflow computer in communication with the insurance data system, the insurance workflow computer configured to receive data indicative of the electronic communication, and to determine one or more insurance-related workflow modifications in response to receipt of the data indicative of the electronic communication.

BRIEF DESCRIPTION OF THE DRAWINGS

A more detailed understanding may be had from the following description, given by way of example in conjunction with the accompanying drawings wherein.

DETAILED DESCRIPTION

Disclosed herein are processor-executable methods, computing systems, and related technologies for achieving efficiencies in connection with tuition debt related data processing, and particularly processing and analyzing of tuition debt insurance. Administration of tuition debt repayment involves complicated and data intensive computer processing, including maintaining and updating records concerning millions of debtors whose records must be updated frequently due to such factors as frequent changes in address and high rates of late payment, partial payment, defaults and other difficulties in connection with loan servicing. Computer-implemented solutions that simplify data processing associated with tuition debt repayment computer systems are desired. The present system addresses complexities of data processing associated with tuition debt repayment computer systems by efficiently providing for insurance data computer systems that arrange for payment directly to lenders and loan servicing agencies in connection with validated tuition debt insurance coverage claims. Moreover, embodiments of the present system efficiently determine coverage start dates and validating claims via communications with third party data system such as data systems of schools and other educational institutions, job search agencies, and other third party data systems. Furthermore, embodiments of the present system efficiently use computer resources by underwriting and pricing tuition debt coverage accurately by using appropriate data elements such as school type, academic achievement markers such as grade point average and class ranking, and other suitable data for underwriting purposes, thereby avoiding inefficient burdens of high claim processing rates.

The present invention provides significant technical improvements to insurance underwriting and insurance claims data processing technology. The present invention is directed to more than merely a computer implementation of a routine or conventional activity previously known in the industry as it significantly advances the technical efficiency, access and/or accuracy of insurance underwriting and insurance claims data processing by implementing a specific new method and system as defined herein. The present invention includes systems and methods to implement interactions of types not previously known in the art between specialized computer systems. The present invention is a specific advancement in the area of insurance underwriting data processing and insurance claims data processing by providing technical benefits in data accuracy, data availability and data integrity, as well as benefits in efficiency of use of data processing, storage and processing resources, and such advances are not merely a longstanding commercial practice. The present invention provides improvement beyond a mere generic computer implementation as it involves the processing and conversion of significant amounts of data in a new beneficial manner as well as the interaction of a variety of specialized insurance, client and/or vendor systems, networks and subsystems. For example, in the present invention efficiencies are achieved in the processing of data relating to administration of repayment of tuition debt, including avoiding the need for numerous electronic communications related to late payments, delinquencies and collection of delinquent accounts.

Embodiments of the present invention addresses the needs of new graduates with large student loan debt in conjunction with a difficult job market by providing new graduates with student loan debt coverage for a period of time after graduation if the graduate is not able to secure employment for that period of time. Embodiments of the present invention implement computer processing arrangements for efficiently processing data to achieve protection for insureds with protection against risk of unemployment after the completion of an insurable degree from certain schools; computer processing arrangements of embodiments of the present invention provide for, in response to an approvable claim by an insured, providing the insured with payments to cover the interest and principal of federal and/or private student loans for a period of time during such documented unemployment. The tuition debt coverage may be a stand alone policy or coverage or added as an endorsement to a current auto, home, and/or rental policies or provided in conjunction with a 529 plan or other similar offering.

Figure 1:
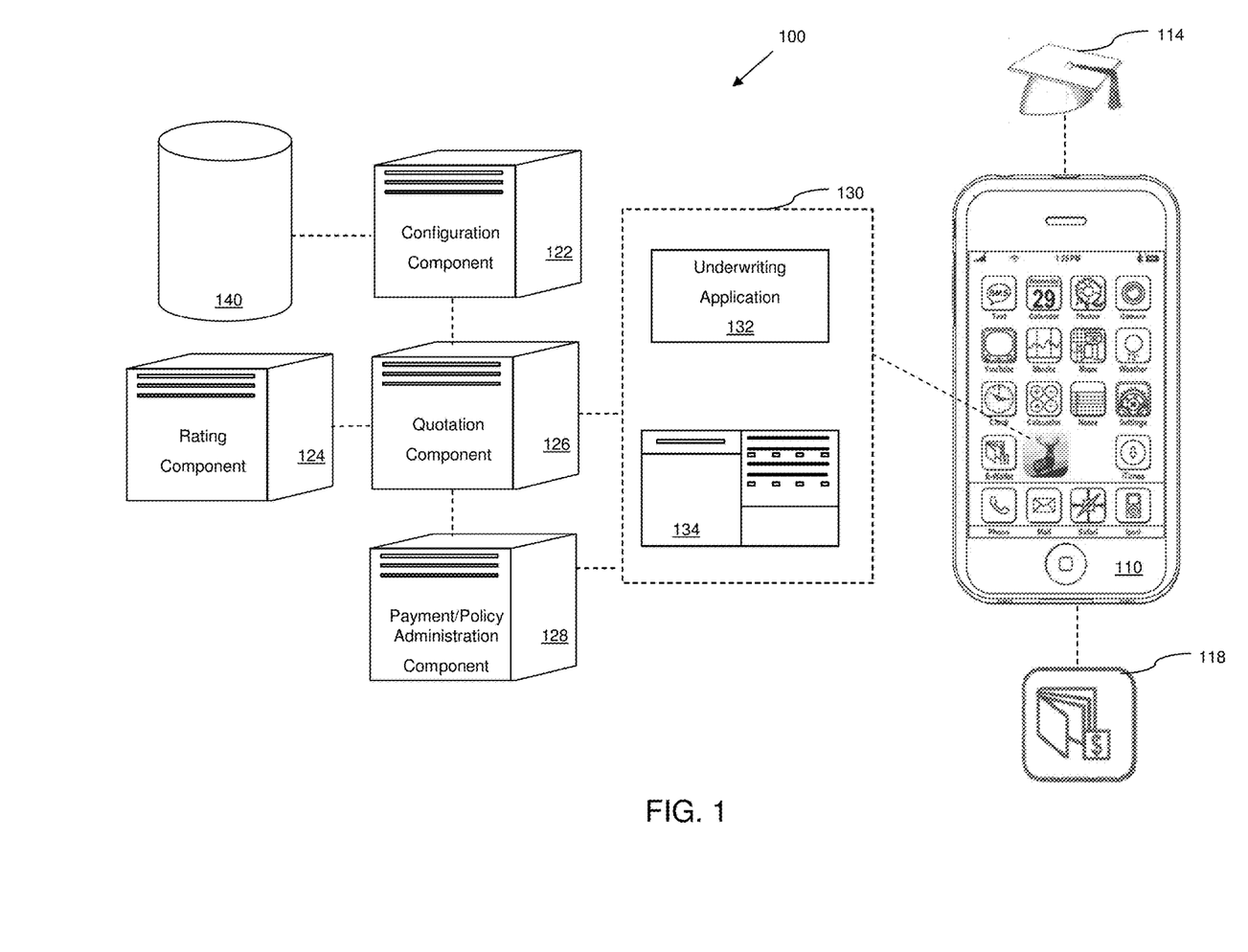
FIG. 1 shows an exemplary computer architecture that may be used for administering tuition debt insurance data.

Features of some embodiments will now be described by first referring to FIG. 1 which illustrates a system architecture 100 within which some embodiments may be implemented. More particularly, FIG. 1 depicts a system architecture 100 in which tuition debt protection plans and insurance policies and insuring arrangements may be quoted, priced, issued and managed. Although the devices of architecture 100 are depicted as communicating via dedicated connections, it should be understood that all illustrated devices may communicate to one or more other illustrated devices through any number of other public and/or private networks, including but not limited to the Internet. Two or more of the illustrated devices may be located remote from one another and may communicate with one another via any known manner of network(s) and/or a dedicated connection. Moreover, each device may comprise any number of hardware and/or software elements suitable to provide the functions described herein as well as any other functions. Other topologies may be used in conjunction with other embodiments.

According to the example architecture shown in FIG. 1, one or more requestor or user devices/devices 110 are provided which comprise devices that may be operated by a user such as an insurance agent, an individual, a consumer, etc. seeking tuition debt coverage. The user operating device 110 is associated with a certain school entity 114 and certain tuition debt 118. Requestor device 110 may interact with Web pages provided by Web server 134 to request a quote, a recommendation and/or to provide data relating to the kinds and options of tuition debt coverage. Web server 134 may include a web application module and a HyperText Transfer Protocol (HTTP) server module. The web application module may generate the web pages that make up the web site and that are communicated by the HTTP server module. Web application module may be implemented in and/or based on a technology such as Active Server Pages (ASP), PHP: Hypertext Preprocessor (PHP), Python/Zope, Ruby, any server-side scripting language, and/or any other appropriate technology.

The HTTP server module may implement the HTTP protocol, and may communicate HyperText Markup Language (HTML) pages and related data from the web site to/from client devices using HTTP. The HTTP server module may be, for example, a Sun-ONE Web Server, an Apache HTTP server, a Microsoft Internet Information Services (IIS) server, and/or may be based on any other appropriate HTTP server technology. The web site system may also include one or more additional components or module, such as one or more switches, load balancers, firewall devices, routers, and devices that handle power backup and data redundancy.

This data may be transmitted to the insurance systems 130 to determine a recommendation as described in detail below. More particularly, pursuant to some embodiments, the requests and applications may be additionally associated with requests for personal line or so called property and casualty based insurance policies (such as, for example, automobile policies and homeowner policies). The requests described herein may be received from individuals or entities seeking insurance coverage or for requests for insurance information. For example, with respect to applications for tuition debt insurance, information such as the cost of the insurance, the term of the insurance, the payment options, the claim procedure and the payout options may be requested. Information may be requested from the user related to the request for tuition debt coverage and may include, but not be limited to type of school (non-limiting examples of school type including Ivy, Non-Ivy bachelor's degree granting institution, Technical, Vocational), the user's major, minor or other field of study, GPA, age, gender, amount of time in school, job history, leadership history and related co-signer information. Insurability conditions may include that the school is an accredited school, accredited by at least one accrediting entity.

As used herein, insurance coverage options may comprise a set of one or more insurance coverages or policy features. Each of the one or more insurance coverages or features may insure against one or more risks such as unemployment with tuition debt, and provide one or more benefits such as payment of interest and principal of tuition debt. In the present description, an insurance coverage defines the parameters of the risk(s) which are covered thereby, and a configuration is a set of one or more insurance coverages, including specified payments, payment plans, limits and deductibles for each of the one or more insurance coverages.

Any number of requestor devices 110 may be employed to receive customer and insurance request data and to present insurance coverage and other information to users or operators of the requestor devices 110. Requestor devices 110 may include but are not limited to cellular telephones, handheld wireless communication devices, personal digital assistants, pagers, laptop computers, tablet computers, smartphones, other mobile display devices, glasses based computing devices, or combinations thereof.

The requestor devices 110 may be in communication with an insurance company 130 or other provider via a Web server 134 or other front end interface that allows remote terminals to send and receive data to the insurance company. The customer and insurance request data are received via the Web server 134 and are stored by data warehouse 140 for later action such as an insurance workflow action or process. Any number or type of data storage systems may store the data in any suitable manner according to some embodiments. Non-exhaustive examples include a relational database system, a spreadsheet, and any other data structure that is amenable to parsing and manipulating data. Data warehouse 140 may be managed by one or more database management systems which may be based on a technology such as Microsoft SQL Server, MySQL, Oracle Relational Database Management System (RDBMS), PostgreSQL, a NoSQL database technology, and/or any other appropriate technology. Data warehouse 140 may receive and store customer and application data as well as store insurance coverage package data and rules which are used in the quoting component 126 and the configuration component 122.

The configuration component 122 acts to receive the customer or insurance request data, such as tuition debt policy requests, and to retrieve tuition debt insurance coverage package data and rules from the data warehouse 140. Configuration component 122 may identify one or more insurance coverage options, configurations and/or packages based on the received data and on data received from Web server 134. Pursuant to some embodiments, different tuition debt insurance packages or different coverage options are assembled for presentation to the customer based on configuration rules and information associated with each request. For example, one tuition debt insurance package may include a coverage option for payment of interest and principal on a federal or private student loan for 12 months after graduation, or 12 months after the first payment is due, provided the insured has made reasonable efforts to secure full time employment and has met all other policy conditions.

When an appropriate tuition debt coverage option is identified by the configuration component 122, pricing data for the tuition debt insurance coverage option may be generated by the quoting component 126 and then presented to the customer or agent via a Web page or other user interface for viewing by a requesting individual on a display screen of a requestor terminal 110. The display screen may be configured, such as via soft keys, radio buttons or other user interface elements, to prompt a user to select a displayed tuition debt insurance coverage option. The display screen may be configured to cause the selection of a selected one of the tuition debt insurance coverage options to be transmitted to insurance systems 130. Insurance systems 130 may route the selection to payment/policy component 128. Payment/policy component 128 may generate insurance policy documents corresponding to the selected one of the tuition debt insurance coverage options, cause policy record data to be generated and stored in a policy record data storage device 140, and generate billing data and billing statements associated with the selected coverage option. Payment/policy component 128 may also generate an indication of coverage, such as a policy document, an endorsement or other suitable confirmation of coverage. The indication of coverage may be transmitted to the requestor terminal 110 for display as an electronic communication, including a premium amount for the tuition debt insurance coverage. Referring again to the system of FIG. 1, each of the components 122, 124, 126, 128 and the insurance systems 130 may comprise any combination of hardware, software and/or processor-executable instructions stored on a non-transitory, tangible medium. According to some embodiments, one or more of the components 122, 124, 126 or 128 may be a component of the data warehouse 140 or the insurance systems 130.

In some embodiments, insurance systems 130 may include an insurance workflow computer. In embodiments, an insurance workflow computer system may be configured to receive data indicative of the electronic communication issued to the requestor terminal, and to determine one or more insurance-related workflow modifications in response to receipt of the data indicative of the electronic communication. Insurance-related workflow modifications may include storing a graduation date of an insured as a policy activation date, determining a premium schedule based on the policy activation date, setting flags to contact the insured regarding meeting policy requirements, such as graduation, grade point average, continuation as a student in good standing, and other requirements, and other workflow modifications.

It should be noted that embodiments are not limited to the devices illustrated in FIG. 1. Each device may include any number of disparate hardware and/or software elements, some of which may be located remotely from one another. Functions attributed to one device may be performed by one or more other devices in some embodiments. The devices of system 100 may communicate with one another (and with other non-illustrated elements) over any suitable communication media and protocols that are or become known.

Figure 2:
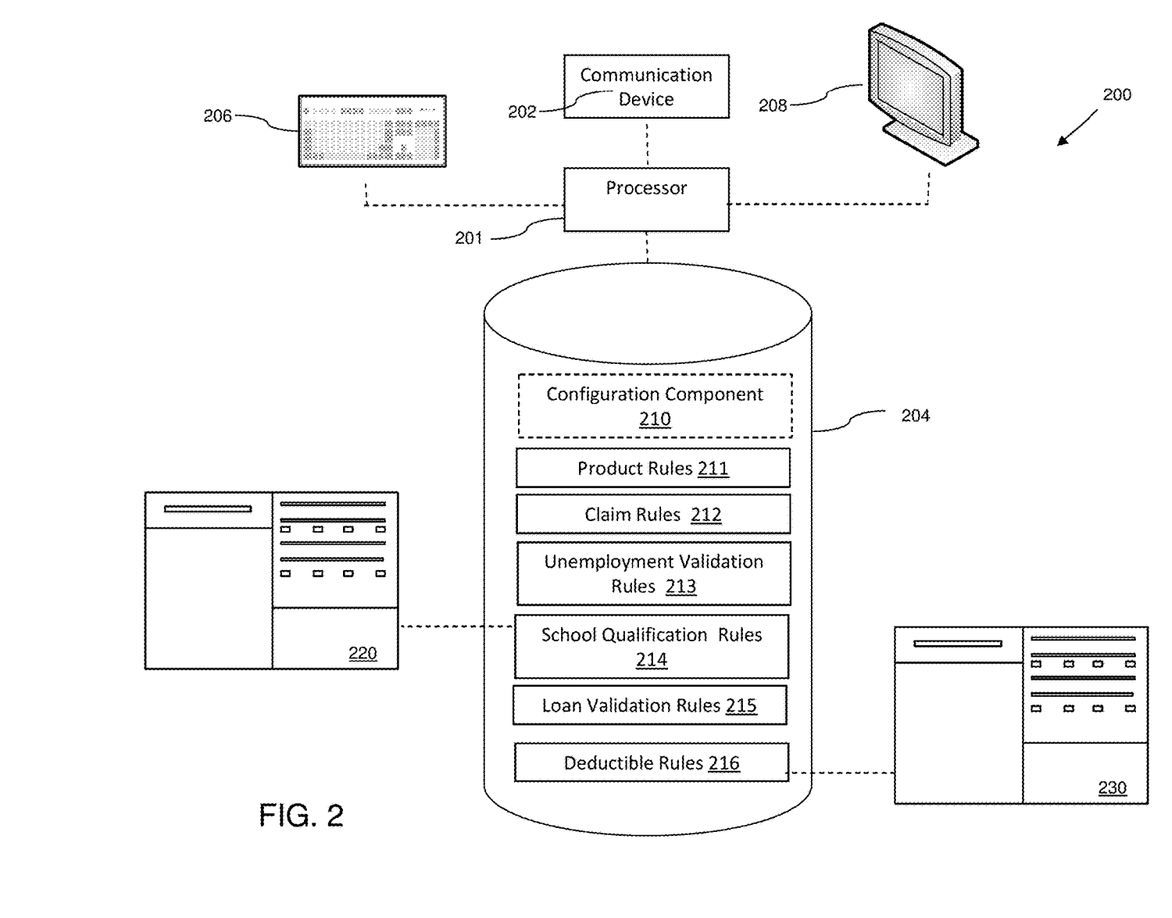
FIG. 2 shows an exemplary system that may be used for the management and analysis of tuition debt insurance data for insurance purposes.

FIG. 2 is a block diagram of a computer system 200 according to some embodiments. Computer system 200 may perform the functions attributed above to the configuration component 122 of FIG. 1. Computer system 200 includes computer processor 201 operatively coupled to communication device 202, data storage device 204, one or more input devices 206 and one or more output devices 208. Communication device 202 may facilitate communication with external devices. Input device(s) 206 may comprise, for example, a keyboard, a keypad, a mouse or other pointing device, a microphone, knob or a switch, an infra-red (IR) port, a docking station, and/or a touch screen. Input device (s) 206 may be used, for example, to enter information into computer system 200. Output device(s) 208 may comprise, for example, a display (e.g., a display screen) a speaker, and/or a printer.

Data storage device 204 may comprise any appropriate information storage device, including combinations of magnetic storage devices (e.g., magnetic tape and hard disk drives), optical storage devices, and/or semiconductor memory devices such as Random Access Memory (RAM) devices and Read Only Memory (ROM) devices. Data storage device 204 stores program instructions for execution by processor 201. Configuration component 210 may comprise a set of such instructions, and may be executed by processor 201 to cause system 200 to operate as described above with respect to configuration component 122 of FIG. 1. This operation may initially include operation of communication device 202 to retrieve tuition debt policy rules and criteria including, for example, no tuition debt product option rules 211, claim rules 212, unemployment validation rules 213, school qualification rules 214, loan validation rules 215 and deductible rules 216. In some embodiments, and as described with respect to FIG. 1, data storage device 204 may comprise a data warehouse or network or cloud type storage facility or mechanism that is in communication with one or more third party databases or servers 220 and 230.

One or more public cloud, private cloud, hybrid cloud and cloud-like networks may also be implemented, for example, to store, handle and conduct processing of one or more transactions or processing of embodiments of the present invention. Cloud based computing may be used herein to handle any one or more of the application, storage and connectivity requirements of embodiments of the present invention. For example one or more private clouds may be implemented to handle tuition debt policy and claims data of embodiments of the present invention. Furthermore, any suitable data and communication protocols may be employed to accomplish the teachings of embodiments of the present invention.

Data storage device 204 may store other data used and/or generated during operation according to some embodiments. For example, the data storage device 204 may store data including configuration rules, policy rules, or the like. The nature and usage of this stored data according to some embodiments will be described in detail below. Each of the rules stored in the system 200 may include data defining a tuition debt policy or claims feature or option. For example, the following individual tuition debt policy features may be provided, some of which may be combined into one or more packages of features such as a package including home and tuition debt insurance, a 529 plan and tuition debt insurance, auto and tuition debt insurance, and renter's and tuition debt insurance, as non-limiting examples.

In some embodiments, rules associated with various product features may be specified as product rules 211. Product rules 211 may specify the mode, type and frequency of premium payments such as rules related to electronic fund transfer of premium payments to the insurer from the insured. Product rules 211 rules may prescribe how a third party such as a parent or other individual or institution may make whole or partial payments on behalf of a student insured. Product rules may provide that the coverage period expires upon the individual securing a first job. The product rules may provide parameters for a job to qualify as ending the coverage period, such as completion of a trial or probationary period, minimum salary, minimum weekly or other periodic hours, and other requirements.

In some embodiments, rules associated with claims may be specified as claim rules 212. Claim rules 212 may specify the manner, timing and duration of claim payments that may be made under the tuition debt coverage. An exemplary claim rule 212 may prescribe how claim payments made be made for a period of 6-18 months during the time the insured is unemployed. The claim payment period may end upon the insured securing a job.

In some embodiments, rules associated with unemployment validation may be specified as unemployment validation rules 213. Unemployment validation rules 213 may relate to standards used in determining whether the insured has met certain standards such as applying for a certain amount or type of jobs and whether the insured has filed for unemployment with a state as an example. Unemployment validation rules 213 may interface with one or more third party systems 220 such as a system associated with an employment agency or headhunter, a school placement office and/or a state unemployment office.

In some embodiments, rules associated with school qualification rules may be specified as school qualification rules 214. School qualification rules 214 may relate to certain standards and requirements for potential insureds to qualify for the tuition debt insurance or qualify for certain premium rates or discounts. For example, school qualification rules 214 may include guidelines on schools such as certain tier ratings and other evaluation criteria for certain school, majors within the schools and GPA within the schools.

In some embodiments, rules associated with loan validation may be specified as loan validation rules 215. Loan validation rules 215 may include guidelines and requirements for verifying and validating insured loans such as loan balance, loan payment information and loan type as an example. Load validation rules 215 may interface with one or more third party systems 230 such as a system associated with the U.S. Department of Education that may be administering one or more federal student loan programs. Federal loan programs may include The William D. Ford Federal Direct Loan Program that may administer loans such as Direct Subsidized Loans, Direct Unsubsidized Loans, Direct PLUS Loans, and/or Direct Consolidation Loans. Another qualifying loan program may include The Federal Perkins Loan Program and other similar federal and/or private student loan programs that may be administered by Sallie Mae, Charter One TruFit, Citizens Bank TruFit, Connecticut Higher Education Supplemental Loan Authority (CHE-SLA), Think Financial and others.

In some embodiments, rules associated with deductibles may be specified as deductible rules 216. By way of non-limiting example, policy holders who have either or both auto and home insurance policies may enjoy combined, disappearing or reduced deductibles based on the combined policies with the tuition debt policies. For example, in some embodiments, a combined policy may include deductible reduction features where the policy holder may receive a deductible reduction on his or her auto policy based on activity on the home policy (or vice versa). In some embodiments, payment of a deductible amount on one of the policies (e.g., such as the homeowners policy) may result in a waiver of all or a portion of the deductible (in a given policy year, for example) on the other policy (e.g., such as the tuition debt policy).

Referring still to FIG. 2, by applying one or more rules and configuration criteria, the configuration component may respond to requests for insurance with tuition debt policy options having certain pricing, underwriting requirements and feature sets. An option may be selected or accepted by a customer, and a corresponding tuition debt insurance coverage policy issued by the insurance company, naming the selected individual as insured. Once a policy has been issued, embodiments provide systems and methods for claim processing. More particularly, embodiments allow claims to be processed once a certain threshold has been reached for graduation and employment effort guidelines. The processing of such claims will now be described by first referring to FIG. 3 which illustrates a claim processing architecture 300 within which some embodiments may be implemented.

Figure 3:
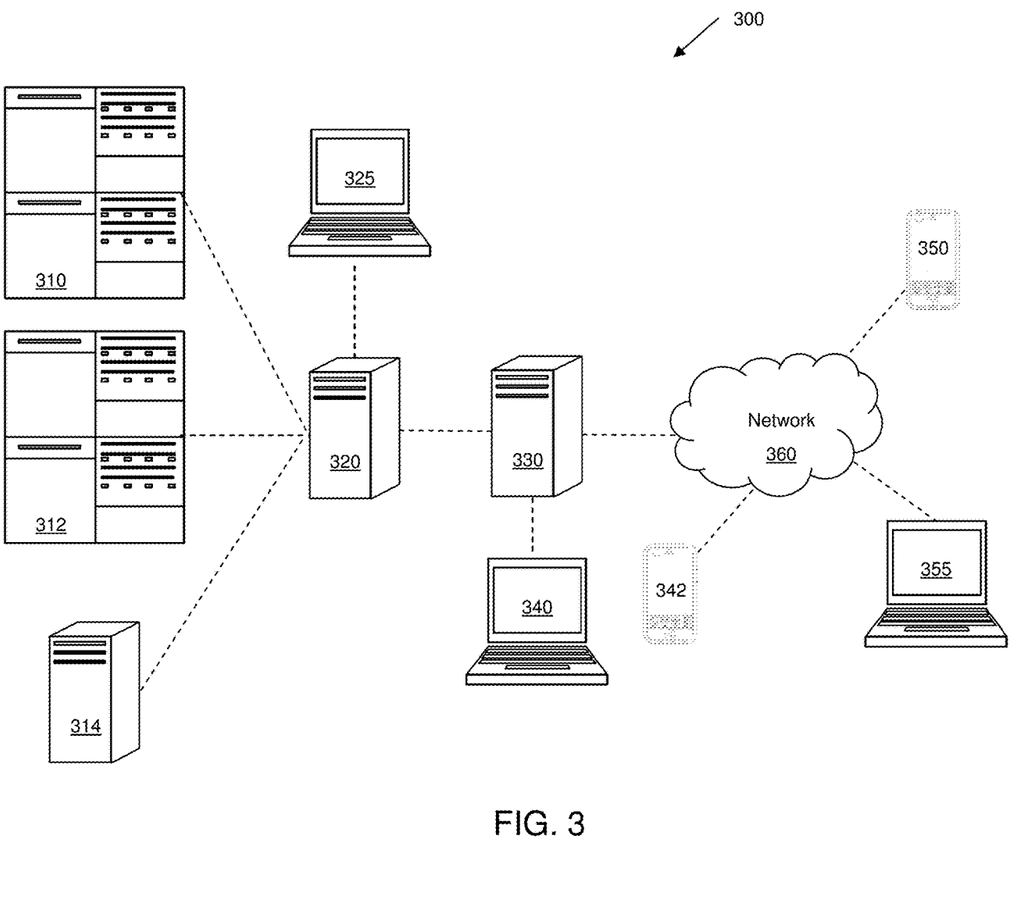
FIG. 3 shows another exemplary system of the present invention.

In particular, in the claim processing architecture 300 of FIG. 3, an insured who has recently graduated and who has suffered a loss involving property covered by each of those policies, is able to submit a claim during a predetermined term of his unemployment using the architecture 300. Although some devices of architecture 300 are depicted as communicating via dedicated connections, it should be understood that all illustrated devices may communicate to one or more other illustrated devices through any number of other public and/or private networks, including but not limited to the Internet. Two or more of the illustrated devices may be located remote from one another and may communicate with one another via any known manner of network(s) and/or a dedicated connection. Moreover, each device may comprise any number of hardware and/or software elements suitable to provide the functions described herein as well as any other functions. Other topologies may be used in conjunction with other embodiments.

According to the example of FIG. 3, policy servers 310-314 store policy information associated with one or more insurance policies such as home, auto, commercial and tuition debt related policies. Policy information may include any combination of policy-related data fields that are or become known, including but not limited to policy type, policy number, insured name, deductibles, coverage limits, riders, endorsements and exceptions. Each of policy servers 310 through 314 may comprise any combination of hardware and/or software, including but not limited to relational databases, application servers, and spreadsheets. One or more of policy servers 310 through 314 may comprise a policy issuing system, a data warehouse of an insurance company or any other aggregator of insurance policy information.

Pursuant to some embodiments, policy server 310 is a source of personal lines automobile policies which have been issued by an insurer, policy server 312 is a source of homeowner policies and policy server 314 is a source of tuition debt policies or endorsements. The homeowner, automobile and tuition dent policies may be maintained by separate business groups of an insurer and thus be maintained on different policy servers and systems (such as server 310-314) or they may be maintained on integrated servers, platforms or database systems.

Each of policy servers 310 through 314 may provide policy information to system 320 asynchronously or according to any schedule. In some embodiments, one or more of policy servers 310 through 314 provides a daily feed of policy information to system 320. The policy information of the feed may be associated with new insurance policies for which an initial premium has been paid or renewal policies for which additional premium are due.

System 320 may comprise any combination of hardware and software to perform processes as described herein. According to some embodiments, when an insured party submits a claim or request for information about a policy, system 320 receives policy information associated with an insurance policy from one of sources 310 through 314 and processes the claim or other request. In general, however, when a request is received involving a policy stored in one of the policy servers 310 through 314, the data is retrieved and returned to system 320 for processing.

System 320, as well as claims management system 330 may comprise program instructions of a database management system, database procedures and/or database applications to process the data stored at those systems or retrieved by those systems. One or more administrator terminals or device 325 may be in communication with system 320 and configured to provide display screens representing data stored in system 320 and options to permit an operator to edit this data and to otherwise provide commands to system 320. For example, an administrator terminal or device 325 may be configured to permit an operator to input commands via a user interface to update a data structure including information associated with a claim or the like. Terminal 325 may comprise any suitable device including one or more input devices, such as keyboards, touchscreens and pointing devices, and display devices such as display screens, including but not limited to a desktop computer, tablet computer, and/or smartphone.

Claim management system 330 may receive policy records and associated claim handling identifiers from system 320. Claim management system 330 may receive a report of a claim associated with an insurance policy and determine the claim handling identifier of the record associated with the insurance policy. A customer service representative may use the claim handling identifier to assign the claim to the appropriate claim-handling organization. In this regard, customer service representatives may operate terminal 340 to access the records of claim management system 330. All terminals described herein may comprise any suitable devices for requesting and displaying user interfaces, including but not limited to desktop computers, cellular telephones, personal digital assistants, and laptops.

According to some examples, an insured individual who has a claim such as experiencing unemployment after graduation submits a claim to an insurance processing system 330 over a network interface. For example, the claim may be submitted using a smartphone 350 or a personal computer 355 to transmit claim information to the claims management system 330.

Whether the claim is submitted via smartphone 350 or computer 355, the claim request is routed to a device 342 associated with a customer service representative. For example, the insured individual may operate smartphone 350 to call a claim-reporting telephone number provided by an insurance company. The call is passed through a network 360 (e.g., the Public Switched Telephone Network, a cellular network, and/or an Internet Protocol network) and terminates at device 342 of a customer service representative. Embodiments may also or alternatively provide claim reporting via one or more other communication modes, such as facsimile, electronic mail, text or World Wide Web.

The customer service representative receives an identifier of the insured's policy (e.g., name, policy number, social security number, etc.) and operates a client application executed by terminal 340 to retrieve a record of claim management system 330 associated with the policy. The customer service representative determines a claim handling identifier of the record and assigns the claim based thereon. Depending on the nature of the claim handling identifier, assignment of the claim may include providing a telephone number of a third-party administrator to the insured or transferring the telephone call to a claim-handling organization of the insurance company. A process is then performed by the claim management system 330 to determine if the claim is valid such as by accessing rules relating to policy claim requirements, accessing claimant data, and applying the rules to the claimant data. By way of example, the rules may relate to requirements to verify efforts by the claimant to obtain employment, and the accessed data may include data obtained from claimants, employment agencies and other third parties including data indicative of applications and resumes submitted, interviews attended, and other information relating to employment efforts by the claimant. Similarly, rules and accessed data may relate to validating the interest and premium payment amounts and process associated with the claimant.

The insurance system 300 of FIG. 3 may provide other administration and maintenance features associated with policies issued pursuant to embodiments of the present invention. For example, a system server 320 may operate to receive and process policy change or update requests and may generate an interface or display screens to allow faster and easier policy service. Agents and insureds may interact with the system 320 to manage customers policy changes in real-time by performing actions such as: (i) updating employment information, (ii) provide an immediate or substantially real time confirmation on a wide variety of policy changes, and (iii) view a billing breakdown, print ID cards and forms, etc.

Server 320 may also include a third party interface to control communications between third party systems and claim data associated with claims processed using claim management system 330. For example, a third party interface may facilitate communication to secure third party data related to an insured who has initiated a claim. As a specific illustrative example, for an insured who has initiated a claim for a tuition debt policy third party interface may provide information related to the claimant's student loan and/or employment effort information such as from a placement firm or headhunter type firm.

In some embodiments, server 320 may also include a notification module or code administering and applying notification and messaging rules associated with individual policies and policy features pursuant to the present invention. For example, the notification code may operate to generate one or more notifications to insured customers or vendors. As a specific example, all active policies stored in policy stores 310-314 may be monitored to identify any upcoming "trigger" events or dates, such as the expiration or activation of a benefit such as activation upon graduation of the insured from the approved school or university.

A number of notifications may be generated using the notifications code of server 320. These notifications may vary depending on the policy feature included in a policy. For example, for insureds having tuition debt based coverage, automated notifications/reminders via email or otherwise of existence of the coverage itself may be generated such as upon a predetermined date of graduation from an institution previously provided.

In some embodiments, policyholders may be provided with one or more options to change features for other benefits, e.g. to increase their coverage amounts or link to a related policy such as an auto or home policy. It should be noted that embodiments are not limited to the devices illustrated in FIG. 3. Each device may include any number of disparate hardware and/or software elements, some of which may be located remotely from one another. Functions attributed to one device may be performed by one or more other devices in some embodiments. The devices of system 300 may communicate with one another (and with other non-illustrated elements) over any suitable communication media and protocols that are or become known.

Figure 4:
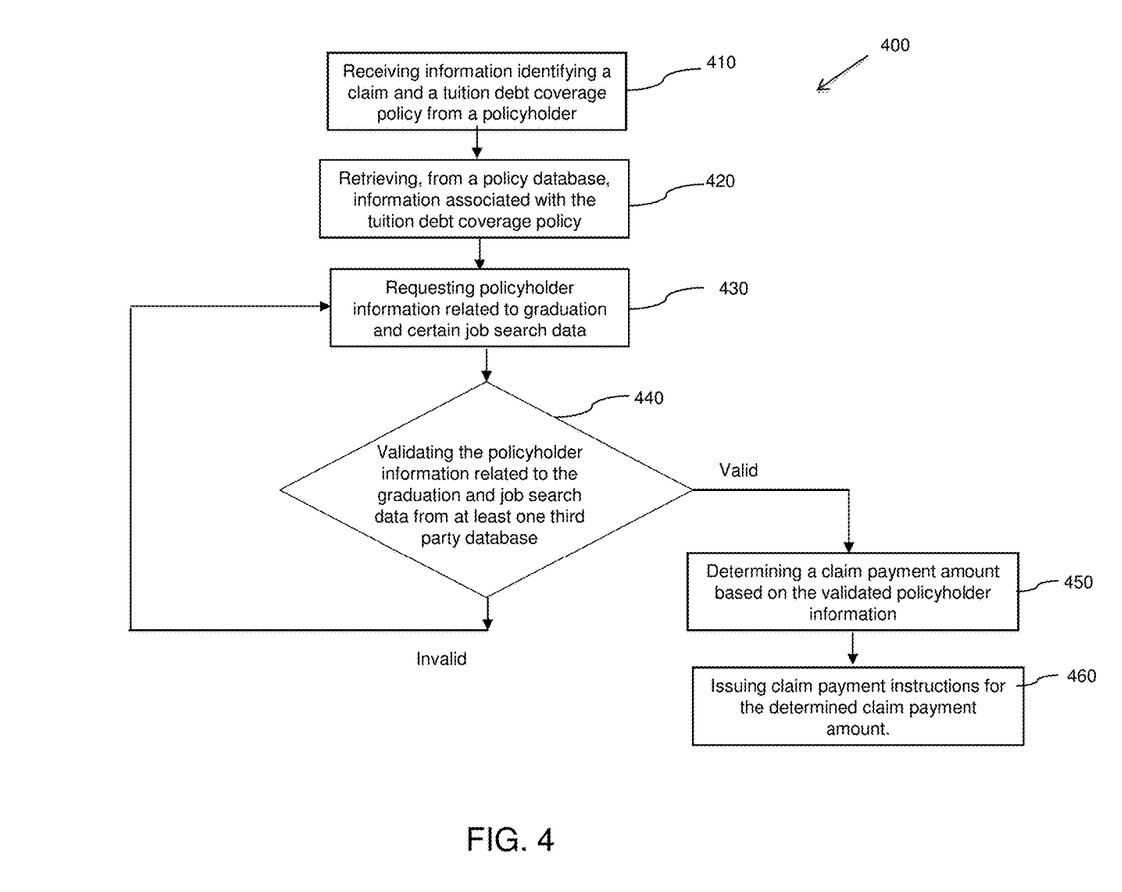
FIG. 4 shows an exemplary process flow of the present invention.

FIG. 4 is a flow diagram of a computer-implemented process 400 according to some embodiments. Various elements of system architecture 300 may execute process 400 according to some embodiments. Process 400 may be embodied within program instructions of claim management system 330, but embodiments are not limited thereto. Process 400 and all other processes mentioned herein may be embodied in processor-executable program instructions read from one or more computer-readable media, such as a floppy disk, a CD-ROM, a DVD-ROM, a Zip™ disk, and a magnetic tape, and then stored in a compressed, uncompiled and/or encrypted format. In some embodiments, hard-wired circuitry may be used in place of, or in combination with, program instructions for implementation of processes according to some embodiments. Embodiments are therefore not limited to any specific combination of hardware and software.

Process 400 may be performed in response to a claim notification submitted by an insured individual (e.g., using the system of FIG. 3). More particularly, the process 400 is performed when a claim notification is submitted for a tuition debt policy issued pursuant to embodiments of the present invention. The process, as will be described, allows an insured individual to enjoy the benefits of the tuition debt coverage in the event the insured has made reasonable efforts to secure employment but is currently unemployed with tuition debt. Further, the process allows an insurance company or other entity providing insurance coverage to efficiently and accurately track such transactions so that policy data may be updated to appropriately record the claims.

Processing begins at 410 where an insurance system (such as the system 300 of FIG. 3, and more particularly, the claims processing system 330 of FIG. 3) receives claim information and tuition debt policy information. For example, the claim and tuition debt policy information may include data submitted or otherwise provided by an insured (e.g., via a phone 350 or computer 355) to an agent or other representative (e.g., operating a phone 342 or computer 340). The claim information received may include information identifying the insured, the tuition debt coverage policy, and/or the loan to be paid, etc. The claim information may also include information about the insured's graduation date and/or information related to their employment efforts. The policy information may include information such as a policy identifier or account number.

Processing continues at 420 where the insurance system retrieves information associated with the tuition debt coverage. For example, in some embodiments, each policy may have an identifier associated with it that identifies a certain insured, a certain school associated with the insured, a graduation date, a loan identifier, etc.

Processing continues at 430 where the insurance system requests policyholder information related to graduation and certain job search data. This request may be made, for example, by presenting a series of questions to the insured, by the insured responding to a series of questions in a survey or claim form, or the like.

Processing continue at 440 where the insurance system validates the policyholder information related to the graduation and job search data. The insurance system may request from a computer system of a school proof of graduation from the school by the individual. If processing at 440 indicates that that the data is not valid, such as by accessing a third party database stating that the policyholder did not graduate, or a job search agency database indicating that the policyholder did not perform a reasonable job search as required in accordance with policy terms, the system will request additional information from the policyholder. If processing at 440 indicates that the policyholder information is valid, processing continues at 450 where the insurance system a claim amount to be paid is determined. This processing may be performed, for example, by retrieving policy records from policy stores 310-314. An example of related policy records are shown below in conjunction with FIG. 5.

Processing continue at 460 where the insurance system operates to issue certain claim payment instructions based on the determined claim payment amount. Instructions may be in the form of direct deposit or electronic fund transfer type instructions that specify a payment amount and a payment mode. For example, payment may be made direct to a loan provider such as a Sallie Mae or the Federal Government. In embodiments, payment may be made to the insured or policyholder. The period and term of such payments may be specified such as a monthly period over a year term.

If after additional information is requested from the claimant, and the additional information is not received, or is not sufficient to show meeting claim requirements, the claim may be denied. A denial notification may be provided via electronic communication. Denial may result from failing to meet thresholds such as posting of resumes on one or more job search sites or social networking sites, failure to submit applications to a minimum number of potential employers, and other factors. Such factors may be weighted and included in one or more algorithms to determine whether a threshold level of job search effort has been achieved. For example, a minimum number of total points in an algorithm including number of postings on job search sites, submissions of resumes, submissions of applications, in person visits to potential employers, telephone calls to potential employers, validated networking meetings, telephone calls and e-mails with individuals having positions providing knowledge of possible job openings, numbers of connections on business social media sites such as the LinkedIn® social networking system, may be provided. The algorithms may provide for different weightings dependent on industry or field pertinent to the degree of the individual. Thus, an algorithm applied to an individual with a communications degree may rank highly applications and contacts with businesses and individuals in the marketing and publishing industries, and weight lower contacts with engineering firms, while an algorithm applicable to an individual with an engineering degree may rank highly contacts with engineering firms and individuals in the engineering field and weight relatively low contacts with publishing and marketing firms. The algorithms may require sustained job search over a period of time, such as meeting a minimum number of points on a monthly basis for a period of months to qualify for claim payments.

Figure 5:
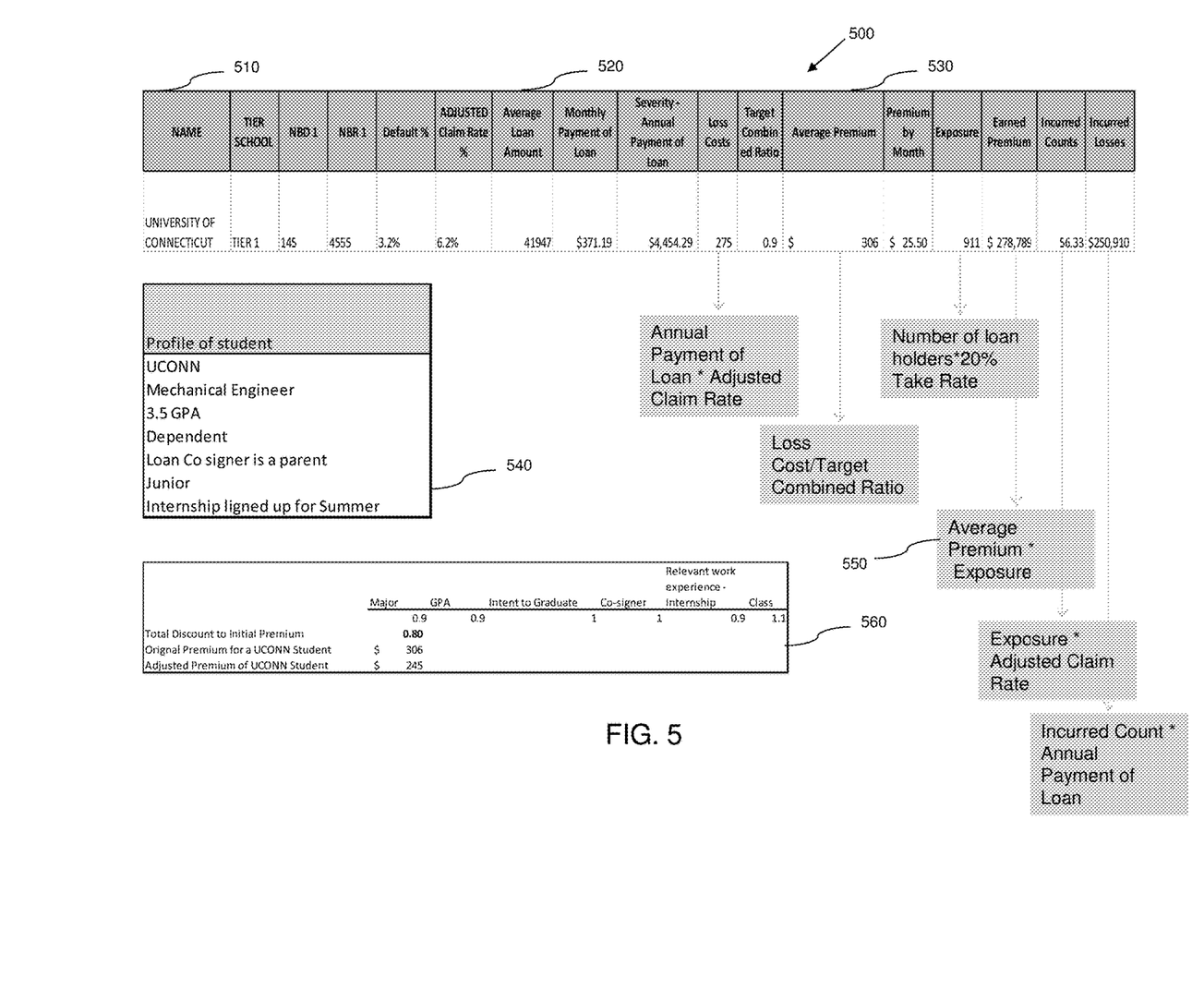
FIG. 5 shows an exemplary data structure of an embodiment of the present invention.

Reference is now made to FIG. 5 which is a tabular representation of a portion of a tuition debt insurance database record 500. Tuition debt insurance database record 500 includes a number of data fields representing data associated with a particular insured. Only several fields such as 510, 520 and 530 are identified for each policy record for convenience and ease of exposition—those skilled in the art will appreciate that a typical record may have more fields and data elements. Some or all of the data populating tuition debt insurance database record 500 may be obtained or generated during an insurance policy underwriting process, policy issuance process (such as by the system 100 of FIG. 1), during a policy renewal process or claims process. Embodiments are not limited to the fields shown in FIG. 5, and each data field need not be populated in some embodiments. Database record 500 may also be tagged, relational or linked such as to data records 540, 550 or 560. Database record 500 may be used to underwrite a specific user or individual such as may be described in record 540 to obtain for example, an average premium exposure 550 as well as an adjusted premium calculation 560.

Figure 6:
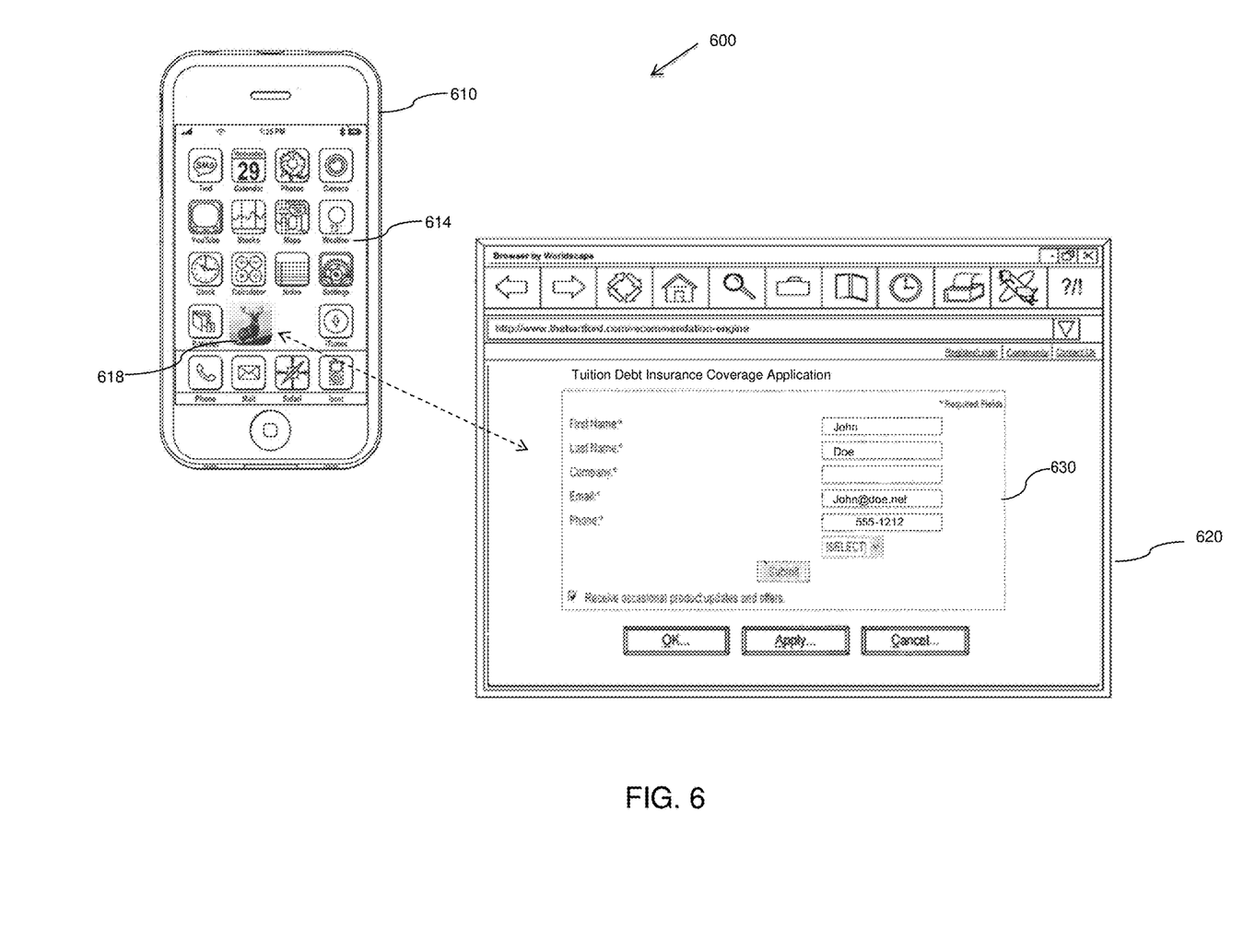
FIG. 6 shows an graphical user interface of an embodiment of the present invention.

An illustrative example of a system 600 including a user device 610 accessing a user interface 614 for the purchase and administration of tuition debt insurance is shown at FIG. 6. User interface 614 may be app type screen that provides access to an insurance company app as an app provided by The Hartford. As shown, The Hartford app 618 is configured to provide a user interface 620 that may display an application form 630 for the initiation and completion of tuition debt insurance coverage. Application form 630 may request and the user may provide, as tuition debt policy request data, information such as Name, Company, Email, Phone, Social Security Number, Existing policy information, Type of school (Ivy, Non-Ivy, Technical, Vocational), Major, GPA, Age, Gender, Amount of time in school, Job history, Leadership history, Co-signer name, Co-signer history, and other related information.

Tuition debt coverage options may include an option in which the insured, or policyholder, is responsible for payment of a portion of the premium payments. A sponsoring party, such as a parent or other relative, may agree to be responsible for another portion of the premium payment.

User interface 620 may also be configure to display two or more coverage options that have been identified (e.g., by the system 100) as being available to a consumer seeking tuition debt insurance. In the user interface shown, a script is dynamically generated for to generate pricing and explain the differences between the two packages. In this manner, customers, agents and other representatives may easily select and bind policy features that have desirable benefits to the customers. Those skilled in the art will appreciate that a wide variety and type of user interfaces may be provided, and that the system 600 is provided for illustrative purposes only. User interface 620 may also be configured to provide access to an insurance claim system for reporting and managing a claim under the tuition debt coverage.

Claim options may be provide that include options involving deductibles under the tuition debt coverage and/or claim payment processes. In one embodiment, the Claimant pays ¼ of the monthly payment while another entity such as the insurer pays ¾ of the monthly payment where if the claimant stops paying, the entity ceases payments as well. In another embodiment involving a delayed claim payment process, the tuition debt coverage may require claimants to pay the first several payments where another entity would then pick up 12 months of coverage after deductible period.

Figure 7:
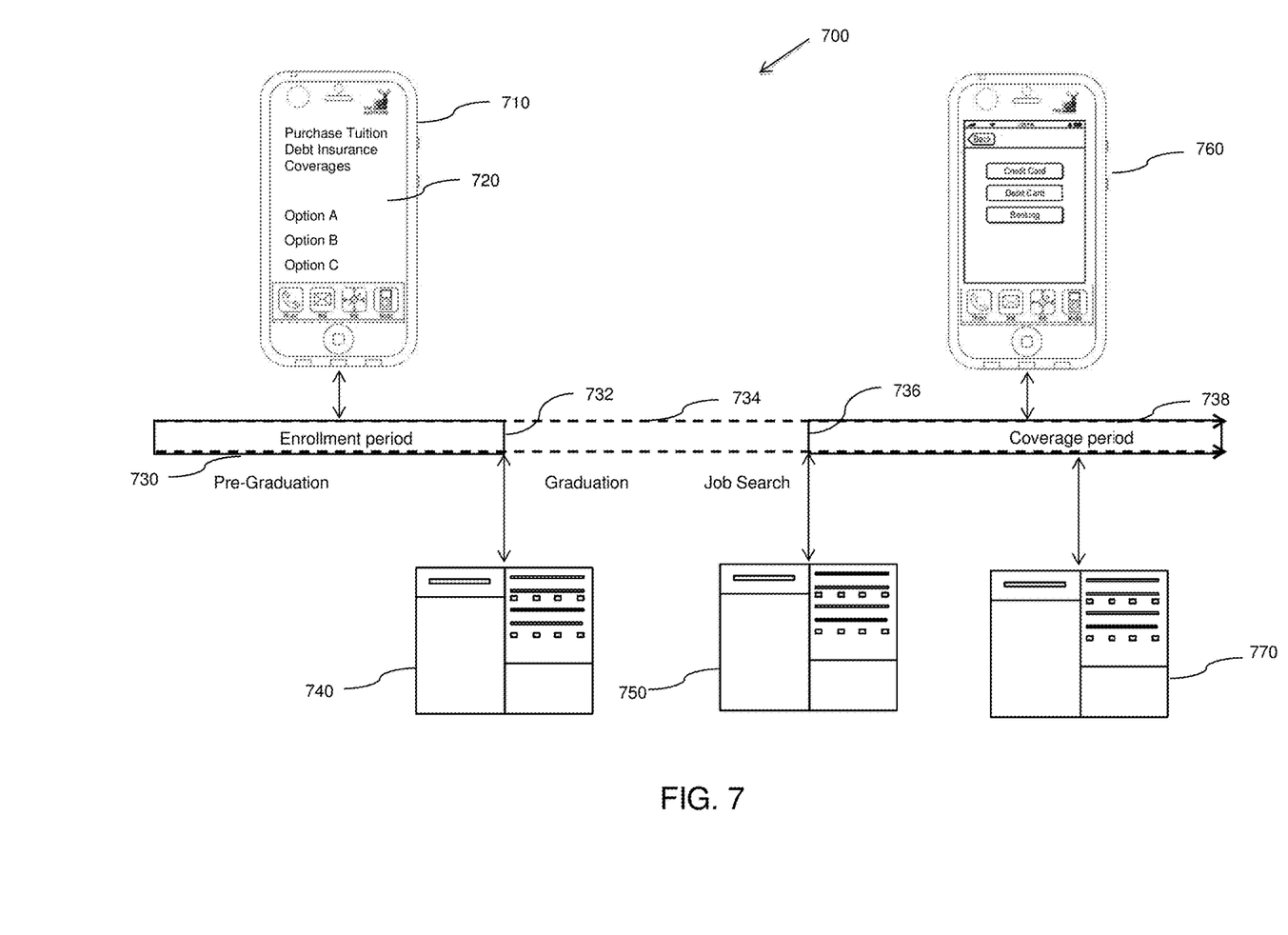
FIG. 7 shows another exemplary system of the present invention.

Referring to FIG. 7, another illustrative example of a tuition insurance debt administration system 700 including a user device 710 for accessing a tuition debt insurance user interface 720 for the purchase and administration of tuition debt insurance is shown. User device 710 may obtain tuition debt insurance during an enrollment period 730 that corresponds to a period prior to graduation of an insured entity. User device 710 may interact with an insurance processing system 740 to obtain the tuition debt insurance from a begin date up to an end date. In embodiments, the end date may be a period prior to a date of graduation 732. In embodiments, an end date may be from three months, six months, one year or two years prior to a date of graduation. After the date of graduation 732, the insured may commence a job search during a period 734 that corresponds to post the date of graduation 732 and prior to filing a claim 736. If the insured's effort to secure a job are unsuccessful, the insured may file a claim only after the date of graduation 732 and completing a good faith effort for a job search during period 734. The graduation date and job search efforts may be validated by information server 750 once the insured files for a claim, such as by submitting a claim using user device 760 to transmit claim information to the claims management system 770. Claim management system 770 may administer the claim during a coverage period 738 that is after the graduation date 732 and job search period 734.

In embodiments, a system according to an embodiment may be configured to receive and process a tuition debt policy request, for coverage of an individual, prior to the covered individual being enrolled in a college or university. In an embodiment, the system may be configured to accept and process a tuition debt policy request on condition that the covered individual be accepted at a college or university. The determination of one or more policy parameters, including, by way of example, premium amount, maximum term of benefit payments, and amount of benefit payments, may be dependent only on the school. In embodiments, the determination of policy parameters may be dependent in addition to the school, on one or more performance characteristics in high school, such as grade point average and/or percentage class rank, in addition to the school.

In embodiments, a system may be configured to receive a tuition debt policy request for coverage of an individual prior to acceptance at one or more colleges or universities. In embodiments, the system may be configured for receiving and issuing policies for coverage of individuals of a threshold minimum age or educational attainment. By way of example, the system may be configured for receiving a request from a person other than the covered individual for issue of a policy. The system may require that the request be from a person having one of a number of specified relationships with the covered individual, such as a parent, stepparent, guardian or grandparent, by way of example. The system may be configured to issue a policy to the person having the relationship with the covered individual, the policy identifying the covered individual as the insured. The system may be configured to store data indicative of the person to whom the policy is issued, as well as the covered individual.

Figure 8:
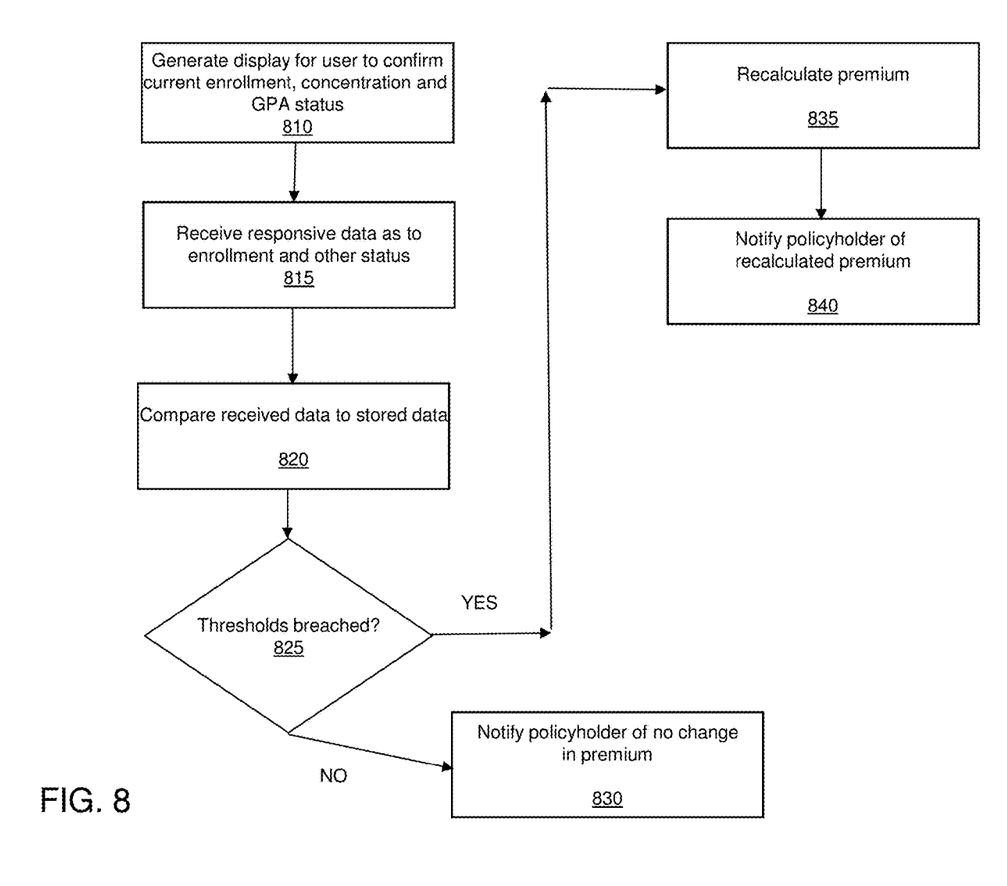
FIG. 8 shows a flow diagram of an audit process in an embodiment of the present invention.

Referring to FIG. 8, in embodiments, on a periodic basis, an audit process may be conducted. By way of example, on a periodic basis following policy issue, an audit may be conducted to determine whether present data relating to the insured is consistent with stored data relating to the insured. The system may be configured for generating 810 a display for the user to respond to one or more questions to confirm such data as: current enrollment school, current enrollment status, e.g., full-time, part-time, number of credits of current enrollment, or on leave; current major, minor, area of concentration or the like; current grade point average and current class rank. In embodiments, the system may be configured to request confirmation of current status directly from a school, or to receive images of documents verifying current status. The display may include check boxes and/or radio buttons, text input fields, and interfaces to provide images of documents, by way of example. In embodiments, the display may be generated via a web server system for display via a browser client on a user device. In embodiments, the display may be generated by a server system interacting with application software being executed by a processor on a user device. The user device provides responsive data, such as via a web server system, to the system.

The system receives 815 data responsive to the inquiry to the user. The system may then verify that the received data includes responses to all questions, and documentary data where requested. If the verification shows that the received data is not complete, then the system may provide supplemental inquiries to the user. Upon verification that the received data is complete, the system may then compare 820 the received data with stored data relating to the policy. If all data is the same or within any applicable thresholds 825, such as an expected change in class standing, or a change in GPA within a threshold, then the system may determine that there is no premium change, and provide 830 a message to a policy holder and/or insured stating that there is no premium change. If one or more data items have changed beyond a threshold, such as a change in school, a change in area of study outside a threshold, or other change, then the system may determine that a premium must be recalculated 835. In embodiments, a premium recalculation may use a same equation or algorithm as an initial premium calculation, or a different algorithm. One or more limits may be used to limit a percentage or dollar amount of premium change. The system may then notify 835 the policyholder of the recalculated premium. Updated data relating to the insured, such as current school, GPA, area of study and class standing may be stored for use in a next audit.

Figure 9:
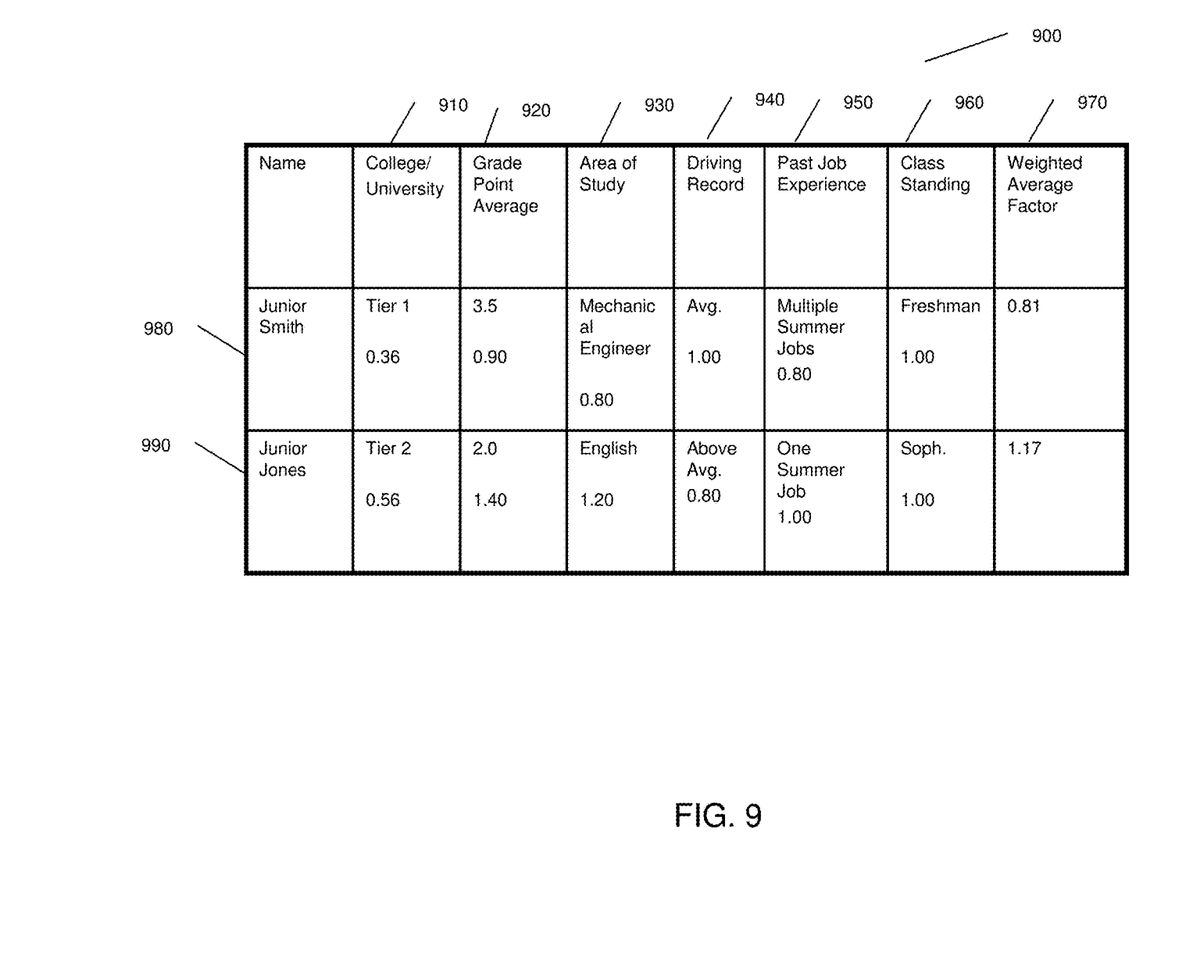
FIG. 9 shows a data table illustrating variables and factors used in determining premiums in an embodiment of the present invention.

Referring to FIG. 9, there is shown an exemplary data table 900 showing data items stored in a database in embodiments of the invention and used in determining premiums. In embodiments, a premium for a policy may be determined based on a base premium, multiplied by a weighted average factor. The weighted average factor may be a weighted average of factors including one or more of factors indicative of a college tier 910, grade point average or other performance characteristic 920, area of study 930, driving record 940, past job experience 950 and class standing 960, as shown, by way of non-limiting example. Other data, such as credit score and other financial data may be employed in embodiments. A factor may be associated with each value of each of the variables. At 970, a weighted average factor for the student is shown. For the two students shown at 980, 990, exemplary different values are shown.

In embodiments, one or more benefits may be provided at a no cost or discounted basis to insureds. Such benefits may include access to career services, such as job search agencies or employment counselors, assistance with resume preparation, interview preparation and practice, as well as services such as financial planning services, real estate related services in connection with obtaining rental or purchased housing within commuting distance of a new job. In embodiments, a computer system of the present invention may provide data in suitable format, such as a suitably formatted xml message, to a computer system of a provider of career services, financial planning services or real estate related services, including an identification of the insured, the identification including contact information such as e-mail address, mobile phone number or other suitable contact information, and an indication that the insured qualifies for no cost or reduced cost services. In response, the recipient computer system may direct a communication to the insured to invite the insured to access the available services.

In embodiments, a covered event may include unemployment, of any period or more than a threshold period of time, prior to expiration of the term of the loan.

The embodiments described herein are solely for the purpose of illustration. Those in the art will recognize that other embodiments may be practiced with modifications and alterations limited only by the claims. For example, though the methods and features described above with reference to FIGS. 1-9 are described above as performed using the example architecture 100 of FIG. 1 and the exemplary system 200 of FIG. 2, the methods and features described above may be performed using any appropriate architecture and/or computing environment. Although features and elements are described above in particular combinations, each feature or element can be used alone or in any combination with or without the other features and elements. For example, each feature or element as described with reference to FIGS. 1-9 may be used alone without the other features and elements or in various combinations with or without other features and elements. Sub-elements of the methods and features described above with reference to FIGS. 1-6 may be performed in any arbitrary order (including concurrently), in any combination or sub-combination.

What is claimed is:

1. A computer system, the system comprising:
(a) an insurance processing computer system, comprising:
at least one processor;
a memory coupled to the at least one processor;
and one or more programs, wherein the one or more programs are stored in the memory and configured to be executed by the at least one processor, the one or more programs including instructions for:
receiving a tuition debt policy request from an individual via a mobile computing device executing an application program configured for display of fields for entry of covered individual information, including name, a school attended by the individual, a major, and a performance characteristic associated with the individual at the school and for transmission of data entered in the displayed fields to the insurance processing computer system, the request being received during an enrollment period prior to a graduation date of the covered individual;
generating pricing information based at least in part on the request data;
providing the pricing information and one or more tuition debt insurance coverage options corresponding to the pricing information to the mobile computing device for display by the application program of the one or more tuition debt insurance coverage options and a user-selectable display element associated with each of the one or more tuition debt insurance coverage options for transmission of a selection of one of the one or more tuition debt insurance coverage options;
receiving the selection of the selected one of the tuition debt insurance coverage options from the mobile computing device;
storing, in a policy record data storage device, a policy record associated with the selected tuition debt insurance coverage option, the policy record including graduation and job search requirements to qualify for claim payments;
transmitting to the mobile computing device an indication of coverage for the individual for the tuition debt coverage option, the coverage being active after the graduation date and job search requirements have been validated; and
performing an audit function, after policy issue, by causing the mobile application to generate a display on the mobile computing device for the user to respond to one or more questions to confirm one or more of: current enrollment school, current enrollment status, current major and current grade point average; receiving from the mobile computing device data responsive to the one or more questions; comparing the received data with stored data relating to the policy; responsive to, based on the comparison, determining that the data is unchanged or within one or more thresholds, determine that there is no premium change and generate a message for display on the mobile computing device stating that there is no premium change; and responsive to, based on the comparison, determining that one or more data items have changed, performing a premium recalculation, and notifying the covered individual of the recalculated premium;
(b) an information server system, in communication with the insurance processing computer system, comprising:
at least one processor;
a memory coupled to the at least one processor;
and one or more programs, wherein the one or more programs are stored in the memory and configured to be executed by the at least one processor, the one or more programs including instructions for:
during a time period after the enrollment period and after a graduation date, accessing and storing job search data from data sources including job search sites and job agency databases relating to a covered individual, based on data received from the insurance processing computer system;
and
(c) a claims management server system, comprising:
at least one processor;
a memory coupled to the at least one processor;
and one or more programs, wherein the one or more programs are stored in the memory and configured to be executed by the at least one processor, the one or more programs including instructions for:
receiving information identifying a claim and a tuition debt coverage policy from a user device operated by a covered individual;
retrieving, from a policy database, information associated with the tuition debt coverage policy;

requesting covered individual information related to at least a graduation date and job search data from the information server system;

validating the covered individual information related to the graduation date and job search data, including obtaining data relating to covered individuals connections on a business social media site;

determining a claim payment amount based on the validated covered individual information, the determining based at least in part on a number of the connections of the covered individual data on the business social media site, weighting the connections based on pertinence of field of the connections to a degree of the covered individual; and issuing claim payment instructions for the determined claim payment amount.

2. The computer system of claim 1, wherein the performance characteristic comprises a GPA associated with the individual, and the request data further comprises an age of the individual, and a gender of the individual.

3. The computer system of claim 1, wherein at least one of the tuition debt insurance coverage options includes an option where the individual pay only a portion of a premium payment and a sponsoring party pays another portion of the premium payment.

4. The computer system of claim 1, wherein at least one of the tuition debt insurance coverage options includes a delayed claim payment process.

5. The computer system of claim 4, wherein the delayed payment process requires the individual to pay a predetermined number of premium payments after a claim is made.

6. The computer system of claim 1, wherein at least one of the tuition debt insurance coverage options becomes active after receipt of proof of graduation from the school by the individual.

7. The computer system of claim 6, wherein the school has to be an accredited school.

8. The computer system of claim 1, wherein at least one of the tuition debt insurance coverage options covers interest and principal of a student loan for a predetermined period of time.

9. The computer system of claim 8, wherein the period of time is one year of documented unemployment.

10. The computer system of claim 9, wherein the coverage ends upon the individual securing a job.

11. The computer system of claim 1, wherein the tuition debt insurance option is only offered after the individual is attending the school in good standing.

12. The computer system of claim 1, wherein the tuition debt insurance option is offered in conjunction with a 529 plan.

13. The computer system of claim 1, wherein the tuition debt insurance option is offered in conjunction with a home or auto policy associated with the individual.

14. A computer system, comprising:
an insurance data computer system comprising:
one or more computer processors, and
a computer usable medium, accessible by the one or more computer processors, having a computer readable program code embodied therein, said computer readable program code adapted to be executed to implement a method for processing data for tuition debt insurance coverages, said method comprising:
receiving, during an enrollment period, a tuition debt insurance quote request from a user device executing an application program configured for display of fields for entry of user information, including name, a school attended by the individual, a major, and a performance characteristic associated with the user at the school and for transmission of data entered in the displayed fields to the insurance data computer system;

determining a price for the tuition debt insurance quote request based at least in part on the data transmitted by the user device;

issuing an electronic communication to the user device, wherein the electronic communication includes at least a premium amount for the tuition debt insurance coverage;

performing an audit function, after policy issue, by causing the mobile application to generate a display on the user device for the user to respond to one or more questions to confirm one or more of: current enrollment school, current enrollment status, current major and current grade point average; receiving from the user device data responsive to the one or more questions; comparing the received data with stored data relating to the policy; responsive to, based on the comparison, determining that the data is unchanged or with one or more thresholds, determining that there is no premium change and generating a message for display on the user device stating that there is no premium change; and responsive to, based on the comparison, determining that one or more data items have changed, performing a premium recalculation, and notifying the covered individual of the recalculated premium;

a communications device in communication with the insurance data system and in communication with one or more networks for communicating the electronic communication to the user;

an insurance workflow computer in communication with the insurance data system, the insurance workflow computer configured to receive data indicative of the electronic communication, and to determine one or more insurance-related workflow modifications in response to receipt of the data indicative of the electronic communication;

an information server computer system in communication with the insurance data computer system and configured for: during a time period after the enrollment period, accessing and storing job search data from data sources including at least one of job search sites and job agency databases relating to a user, based on data received from the insurance data computer system, the job search data including data relating to connections of a user on a business social media site; and a claims management server system configured for receiving information identifying a claim and a tuition debt coverage policy from a user device; requesting user information related to at least a graduation date and job search data from the information server system, and determining eligibility of a claimant for payment under a policy based at least in part on the user information received from the information server system, the determining further based at least in part on a number of the connections of the user data on the business social media site, weighting the connections based on pertinence of field of the connections to a degree of the user.

15. The system of claim 14, wherein the insurance workflow modification comprises storing the graduation date of the user as a policy activation date.

16. The system of claim 14, wherein receiving a tuition debt insurance request comprises requesting age, amount of time in school, job history, and leadership history.

* * * * *